Figure 1:
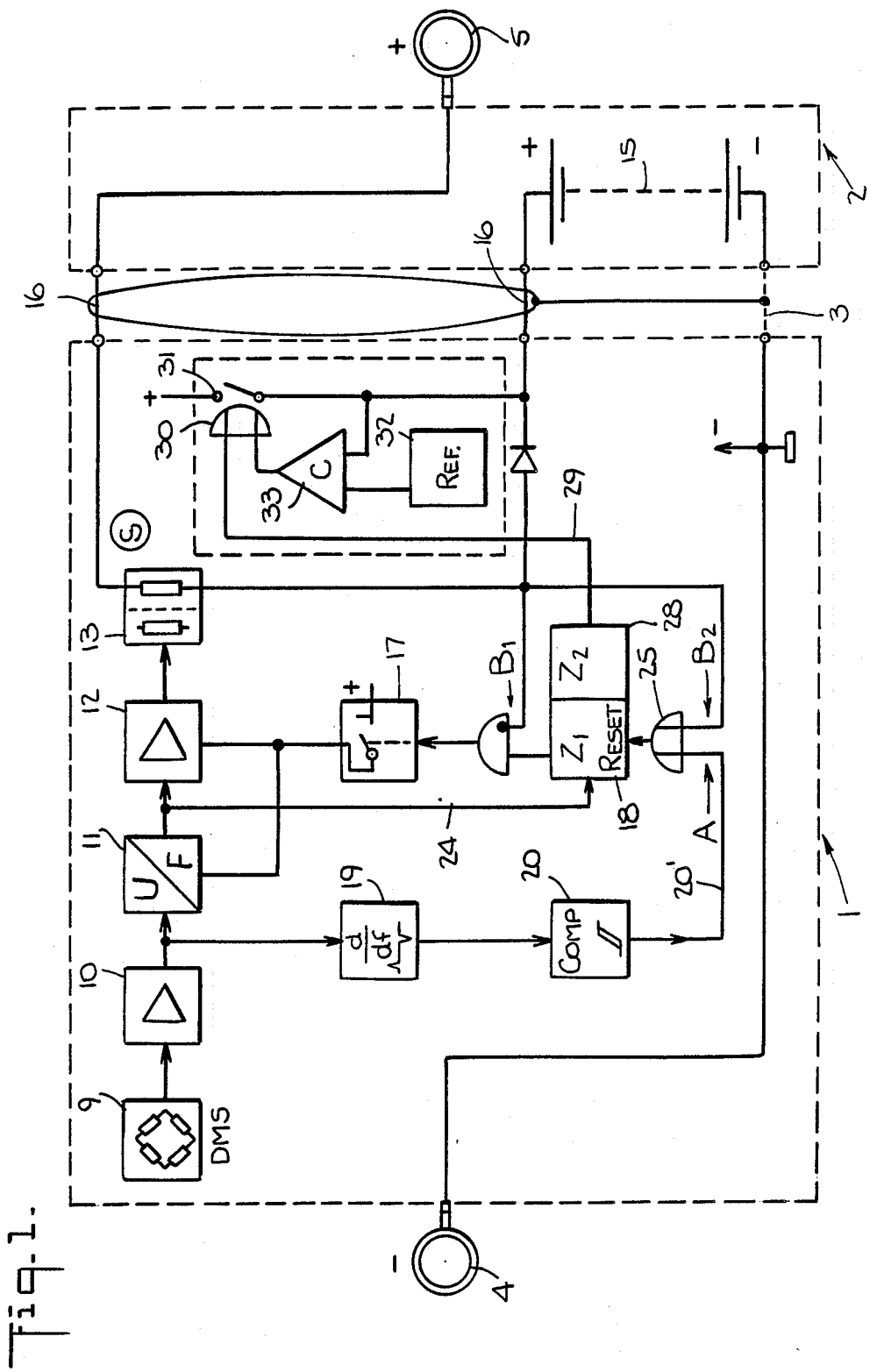

United States Patent [19]

Vemmer

[11] Patent Number: 4,960,001
[45] Date of Patent: Oct. 2, 1990

[54] TRACTION DYNAMOMETER FOR MEASURING TENSILE FORCES IN THE LAYING OF CABLES

[75] Inventor: Helmut Vemmer, Wuppertal, Fed. Rep. of Germany

[73] Assignee: Peter Lancier Maschinebau-Hafenhütte GmbH & Co. KG, Muenster-Wolbeck, Fed. Rep. of Germany

[21] Appl. No.: 272,893
[22] PCT Filed: Mar. 16, 1988
[86] PCT No.: PCT/EP88/00207
§ 371 Date: Nov. 8, 1988
§ 102(e) Date: Nov. 8, 1988
[87] PCT Pub. No.: WO88/07183
PCT Pub. Date: Sep. 22, 1988

[30] Foreign Application Priority Data

Mar. 18, 1987 [DE] Fed. Rep. of Germany ....... 3708749

[51] Int. Cl.$^5$ ............................................... G01L 5/10
[52] U.S. Cl. ............................. 73/862.67; 73/862.67
[58] Field of Search ........... 73/862.39, 862.42, 862.44, 73/862.67; 340/668; 307/296.3

[56] References Cited
U.S. PATENT DOCUMENTS
4,458,880 7/1984 Conti .................. 73/862.44 X FOREIGN PATENT DOCUMENTS
2900770 7/1980 Fed. Rep. of Germany ... 73/862.39

Primary Examiner—Charles A. Ruehl
Attorney, Agent, or Firm—Felfe & Lynch

[57] ABSTRACT

Tension dynamometer which, when in traction connection with a cable, serves to determine the tension forces during the laying of the cable, the dynamometer including the following parts:
 a strain gauge (9),
 a preamplifier (10),
 a voltage-to-frequency converter (11) which converts the signal from the force measuring sensor,
 a transfer circuit (12, 13) which uncouples the converted signal of the force measuring sensor and transfers it to a reading station, and
 a storage battery (15) to supply power to the above-named elements.

The dynamometer additionally has a time switch (17, 18) which interrupts the power supply of at least one current-consuming element after an established period of constant tension force and turns it on again upon the occurrence of a tension force change, or extends this period by an established length of time upon the occurrence of a tension force change during the period and during the extension does not interrupt the power supply.

13 Claims, 2 Drawing Sheets

TRACTION DYNAMOMETER FOR MEASURING TENSILE FORCES IN THE LAYING OF CABLES

The invention relates to a traction dynamometer in tensile junction with a cable, which serves to determine the tensile forces in the laying of the cable, the dynamometer including at least the following parts:
- a force sensing means, e.g., a strain gauge,
- in some cases a preamplifier connected to the force sensor,
- a voltage-to-frequency converter which converts the signal of the force sensor,
- a transfer circuit which decouples the converted signal from the dynamometer and transfers it to a read-out station, and
- a storage battery to supply current to the above elements.

Traction dynamometers are supplied by FERTEX of France; they are inserted between the cable pulling rope and the actual cable itself, so that it will always be possible to know what traction forces are present in the cable. The signal is transmitted through the pulling rope itself, which is made of metal. In the area of the winch is a receiver which is equipped with an electronic circuit which displays, records and monitors the values measured. On the basis of the values measured other actions can also be controlled: for example, the winch can be stopped or accelerated.

The known traction dynamometer has a housing which contains, in addition to the electronic parts, a storage battery. This is generally a rechargeable nickel-cadmium storage battery. The energy content of this battery is limited; accordingly, the length of time for which the dynamometer can operate is determined by the amount of power it consumes.

In the usual course of the use of a traction dynamometer of the kind described above, between 500 and 2000 meters of cable are pulled by the cable winch, and there is a tendency to haul still greater cable lengths. This hauling operation, which calls for many precautions, usually takes several hours for such lengths. It happens relatively often that the cable cannot be pulled any further beyond a portion of its length due to unforeseen impediments such as a fault in the pipe, because the maximum allowable tension would be exceeded. In such a case the hauling has to be interrupted. It is necessary to dig up the cable ditch or the hauling pipe in the area of the end of the cable. This causes the loss of more time during which the storage battery powered dynamometer is consuming power. In such cases, therefore, the energy in the charge is no longer sufficient to feed the dynamometer. It becomes necessary then to replace the dynamometer. This replacement involves additional delay if only on account of the necessary operations of digging it up and replacing it. Furthermore, however, the calibration of the dynamometer, which was performed before the cable pulling started, is no longer correct if the dynamometer to be recharged is replaced with a second, fully charged dynamometer.

The problem accordingly poses itself of devising a traction dynamometer of the kind described above, in which the current consumption will be reduced, so that the dynamometer will run on the same high-quality storage batteries for a longer period of time sufficient for an ordinary cable hauling and metering program which can extend over an entire day, without replacing the dynamometer.

SUMMARY OF THE INVENTION

This problem is solved by reducing the current consumption in the periods in which no measurements are being performed. This is accomplished by providing the dynamometer with an additional time switch which interrupts the power supply of at least one current-consuming element after an established time interval $t_1$ of constant tension, and does not turn it on again until a change occurs in the tension on the dynamometer. Upon the occurrence of a change in tension during the constant-tension period, the time interval leading up to the interruption of the power supply is, of course, extended by an established amount, and the power supply remains uninterrupted during the extension of time.

The dynamometer is accordingly so designed that, after the storage battery is charged and the dynamometer is taken out of the charger, the current-consuming electronic groups, especially the output stage and the voltage-to-frequency converter, are first turned on, but in the case of relatively long maintenance and adjustment periods, exceeding 10 minutes, for example, they are turned off. Preferably the dynamometer and the preamplifier that follows it, and the control circuits, are excepted from the shutoff. They are operated at minimum power consumption in a power-saving stand-by circuit. In this state the dynamometer can be mounted without appreciable current consumption between the low-voltage cable and the steel pull rope. The change in traction is accordingly defined as a certain signal from the preamplifier which is fed through a difference circuit which is activated only by signal changes $$\frac{du}{dt} \neq 0$$

and which, whenever its output signal exceeds the threshold voltage of a comparator, gives the time switch a reset signal, but the dynamometer and the preamplifier, difference circuit, comparator and the time switch are excepted in this case from the shut-off.

The electrical turning on and activation of the dynamometer is performed first by a brief pull on the steel rope with the cable pulling winch, so that a slight force is briefly exerted on the dynamometer. If the latter is designed, for example, for a tension force of 10 kN, a change in force between 10 and 100 N is specified.

The change in the tension force can be detected by mechanical tension switches. Preferably, however, in the case of a dynamometer with the force measuring sensor and preamplifier turned on, the change in force is detected by these units. By means of an actuating pulse, a counter is made to reset, so that it begins the count again.

A specific, predetermined time period t is counted in each case by the counter. This time period should, according to the applicant's experience, be around 10 minutes. However, shorter or longer time periods are conceivable, so that it can be assumed that the established time period $t_1$ in the above sense can be between about 2 and 20 minutes. This means that, if during this period no pulse signaling a tension change reaches the time switch, this switch will preferably shut off the power supply to the voltage-to-frequency converter and final amplifier. The system will be turned on whenever a change in the tension occurs, regardless of the force actually applied. Then the voltage-to-frequency converter and the output amplifier will be turned on.

The dynamometer now transmits a frequency differing from the established basic frequency. After the turn-on at the beginning of work, the pulling process can be accordingly continued without interruption. If the preset time period ends, the dynamometer automatically shuts off again.

If the pulling is begun within the preset time period $t_1$, i.e., for example without the preset 10 minutes, the pulse counter of the time switch receives a RESET triggered by a switching pulse, and this initiates another control count of n pulses. Only when the pulse counter is able to count through the n pulses without a RESET, will it also trigger a shut-off pulse. The RESET is preferably produced through a preamplifier which is connected to the output of the dynamometer's sensor. As a consequence of the natural load fluctuations, new control pulses are constantly produced thereby. If, as in the example given above, the pulling process is interrupted, while the dynamometer is at a point to be excavated, the dynamometer shuts off automatically after the preset time period of, e.g., 10 minutes, regardless of whether the tension force has decreased to zero, and it will pass over into a power saving stand-by position. If the pulling operation is resumed, a short pull on the rope will suffice to reactivate the dynamometer. By the above-described arrangement it is assured that the dynamometer will be turned on only for the time during which it is actively measuring. This time, however, is generally so short that it is possible to work for a full day with a single dynamometer without the occurrence of a complete discharge of the storage battery.

It is furthermore advantageous to equip the above-described traction dynamometer in such a manner as to forestall operator error. This will include preventing the power amplifier usually connected to the output of the voltage-to-frequency converter from being galvanically connected to the charger in short-circuit operation. Accordingly, it is proposed to provide an additional shut-off circuit which will be able to produce a shut-off even before the end of the preset time period (10-minute period) when the dynamometer is connected to a charger to recharge the built-in storage battery. The switching voltage thus occurring will shut off the power amplifier and the voltage-to-frequency converter when a charging voltage is applied to the poles of the storage battery.

When the storage battery charging voltage, i.e., a switching voltage, is applied, a RESET signal is accordingly likewise produced for as long as it is applied. After the storage battery charging voltage is shut off the counter unit will automatically turn on the control switch again, while the electrical activation will be performed by shutting off the charging voltage regardless of the mechanical activation already described in the case of mechanical force change.

Accordingly, the automatic electrical actuation of the traction dynamometer after the battery is charged makes it unnecessary to produce a mechanical actuation through a change in force when one is performing the null-point calibration of the measuring signal receiver. Also, it is advantageous to divide the traction dynamometer into two parts. For this purpose two so-called thimbles are provided, which are in the form of cylindrical bodies. These are connected to one another by a wire rope. This division makes it possible to make the transducer much more flexible than in cases in which all parts of the dynamometer are contained in a single casing. Here, the one thimble will carry the storage battery, while the other one, directly mounted on the cable, will contain the parts of the electronic measuring circuit, especially the force measuring sensor. These two thimbles are connected together by a pair of conductors.

A third connecting conductor between the two cable thimbles can be constituted by the wire rope itself, the latter being at the electronic ground potential, so that the wire rope itself as well as the housing of the thimble will act as an electrical shield.

The connecting wire rope is advantageously held in the storage battery thimble in an insulated manner, so that the storage battery thimble can have a different potential than the transducer cable thimble.

Lastly, this arrangement is advantageous also because the two casings of the cable thimbles constitute the poles through which the AC measuring voltage is put out and at the same time these poles serve for recharging the batteries.

Figure 2:
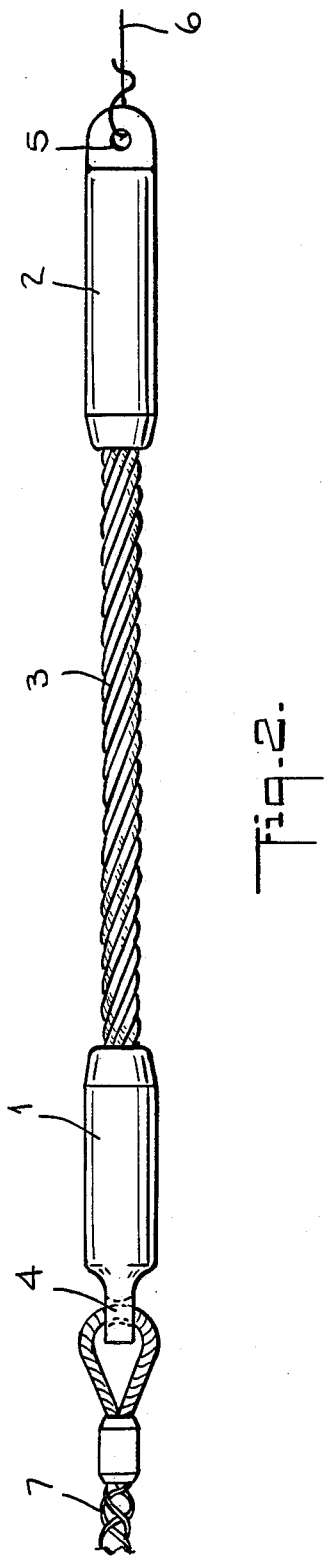

An embodiment of the transducer is represented in the drawing. The figures in the drawing show the following:

FIG. 1 is a schematic diagram of the electrical parts of a transducer in accordance with the invention, FIG. 2 shows the transducer in a bipartite form.

As it is known, the attachment of the pull rope to the cable being buried is accomplished by means of a traction dynamometer in the form of a cable traction head shown in FIG. 2. Otherwise, however, such heads can have a single casing, such as is known in the state of the art referred to above. The embodiment that is described below is therefore not to be understood as limiting the scope of the invention.

FIG. 1 and FIG. 2 represent a traction dynamometer which consists of two so-called thimbles 1 and 2 and a wire rope 3 connecting them together. At their ends the thimbles 1 and 2 bear the traction eyes 4 and 5. Parts 1 to 5 are represented diagrammatically also in FIG. 1. The traction eye 5 is attached to a pull cable 6 and traction eye 4 is attached to a so-called "cable grip" 7 which closes around the head end of a cable and thus produces a mechanical connection thereto. The force detecting thimble 1 is electrically connected to a storage battery 15 in force detecting thimble 2 by two insulated internal conductors 16 in the wire rope 3 (cf. FIG. 1).

It is to be noted at this point that the traction dynamometer can be used without substantial modification also for the pulling of ropes, hoses and similar articles, so that the term "cable" in the claim extends also to such articles.

The tension exerted on the cable corresponds to the tension force prevailing between the two traction eyes 4 and 5. This force is sensed by a force measuring sensor, strain gauges 9 in this case, and transmitted as an electrical voltage signal to a preamplifier 10. The strain gauges are arranged, for example, in the form of a bridge circuit. Any change in the tension on these strain gauges 9 produces a voltage change at the bridge output. The level of the voltage present at the bridge output is a measure of the magnitude of the tension prevailing in the cable.

After this signal is amplified in the preamplifier 10 it is fed to a voltage-to-frequency converter 11. The frequency-modulated output signal is fed to a transfer circuit which in the present case includes a final amplifier 12 and a transformer 13. The transformer 13 serves for the isolation and for the impedance matching and control of the final amplifier 12.

Accordingly, a signal S is available at the output of the transfer circuit, which can be transmitted and further processed in a known manner.

The above-named parts are all housed in the thimble 1.

In the thimble 2 is the storage battery 15 which supplies the electrical parts with a supply voltage and a supply current through two insulated internal conductors 16 in the appropriately guided and electrically equipped wire rope 3. The conductors leading to the individual electronic parts are not represented in detail. Conductors are shown only where they are essential to the invention.

The supply voltage serving for the operation of the voltage-to-frequency converter 11 is supplied through an electronically actuated switch 17. The switch 17 is controlled and actuated through a counter block 18 ($Z_1$) which, after being reset to zero, starts the count and counts up to a number n. As soon as this number is reached, a certain preset time period $t_1$ of, for example, 10 minutes, has passed. If the count n is reached, the counter block 18 operates the switch 17 which thus interrupts the power supply to the voltage-to-frequency converter and thus shuts it off.

A signal voltage with a variable frequency can be taken from the output of the voltage-to-frequency converter 11. The variability of the frequency, however, differs so little from the standard frequency that this frequency can be used as the cycling frequency for the counter block 18 to which it is fed through a conductor 24. This makes a separate frequency generator unnecessary. Such a frequency generator can, however, be incorporated if desired.

Preceding the counter block 18 is a differentiating amplifier 19 which is applied to the output of the preamplifier 10. In the event of voltage fluctuations at the output of the preamplifier 10, the differentiating amplifier 19 will put out pulses (signal A) through a comparator 20 to the counter block 18 and thus reset the latter and start another count. As long as the counter block 18 is counting, the switch 17 is closed and the circuit to the voltage-to-frequency converter 11 and to the final amplifier 12 through line 21 is not interrupted. This means on the other side that, when the tension is constant or certain minimal force variations on the strain gauges 9 are not exceeded, no voltage changes occur either, so that no reset pulses reach the counter block 18 through the line 20. The counter block can therefore count undisturbed up to the number n and thus actuate the switch 17. Thus, the entire electronic system of the thimbles 1 will be shut off except for the strain gauge 9, the preamplifier 10, the differentiating amplifier, comparator 20 and the time switch 17 and 18, so that only the extremely low idle current still flows and is consumed by parts 9, 10, 17, 18, 19 and 20. The rest of the parts consume virtually no current and thus spare the storage battery 15.

When the work has been completed, or whenever the traction dynamometer is accessible before then and there is time to spare, the pickup can be connected to a charging station (not shown). For this it suffices to connect the appropriate charging voltage to the two tension eyes 4 (the minus pole when charging) and 5 (the positive pole when charging). To prevent the final amplifier 12 and the transformer 13 from operating against the charging voltage in this case, an additional control voltage $B_1$ is provided which likewise controls the switch 17 and cuts out the circuit when a charging voltage is acting from the outside on the pickup.

When the storage battery charging voltage is applied, the control signal $B_2$ acts through an OR gate 25 on the counter block 18 and resets the latter, so that when the charging voltage is shut off the traction dynamometer will automatically be turned on for n counting pulses (e.g., 10 minutes). This electrical turning on of the traction dynamometer makes it unnecessary to turn on the receiver mechanically by a change in tension when recalibrating the receiver.

It is advantageous to provide additional possibilities for shutting off in addition to the shut-off after a time period $t_1$. If the traction dynamometer, for example, is to be put away, it is desirable to perform a shut off after a time period $t_2$ much longer than $t_1$, such as 24 hours, for example. The dynamometer can then be reactivated by putting it into a charger so that the voltage $B_1$ is produced.

To provide for this last-mentioned shut off, an additional counter $Z_2$, reference number 28, is provided. This is usually an additional output of the existing counter, which counts with a higher binary stage, i.e., both counters $Z_1$ and $Z_2$ are served by the same clock, but different binary stages are connected to their outputs. The time period $t_2$ in which the second counter $Z_2$ emits a switching signal is around 24 hours.

The switching signal runs through line 29 to the OR gate 30 with switch 31, so that the power is always interrupted whenever the time $t_2$ of 24 hours is exceeded. Another possibility for the interruption of all power-consuming elements is for a comparator 33 to compare the voltage signal $B_1$ coming from the accumulator, with a reference voltage 32, and, in the event of an under-voltage, to operate the voltage-controlled switch 31, so that the power supply is likewise interrupted.

If the traction dynamometer is placed in a battery charger, a reset signal is given by the charge voltage $B_2$ to the counters $Z_1$ and $Z_2$, so that they begin again to count. Furthermore, it is necessary that the voltage signal $B_1$ rise above the reference voltage when the switch 31 is to turn on the power supply again. If this happens the apparatus is ready for operation again, as described in the beginning.

The pickup thimbles 1 and 2 with their tension eyes can be used simultaneously for charging the storage battery. As it appears in the figures, the electronic parts are housed in thimble 1 and the storage battery in thimble 2. This mechanical separation and connection by a wire rope 3 make the dynamometer very flexible and adaptable to a great variety of conditions (e.g., short pipe radii).

Accordingly, the wire rope 3 itself can serve as a third connecting line between the two thimbles 1 and 2. The rope is at the electronic ground potential, so that the rope 3 as well as the casing of cable thimble 1 act as an electrical shielding. The wire rope 3 is insulated from the storage battery cable thimble 2, so that the latter can have a different potential with respect to the dynamometer cable thimble 1.

It is to be noted that additional safety switching operations can be actuated by means of additional circuit elements to be operated electronically or manually.

What is claimed is:

1. Tension dynamometer, which in traction connection with a cable serves for detecting the tension forces in the laying of the cable, the dynamometer comprising:
   a force measuring sensor, a voltage-to-frequency converter which is at least one current-consuming element and which converts the signal from the force measuring sensor, a transfer circuit which uncouples the converted signal of the force measuring sensor and transfers it to a reading station, a storage battery to supply power to the above components, the dynamometer additionally including a time switch which interrupts the supply of current of at least one current-consuming element thereof after a predetermined period of time $t_1$ of steady tension force, and does not turn it back on again until a tension force change occurs.

2. Tension dynamometer in accordance with claim 1, which includes a preamplifier connected to the force measuring sensor and a differentiating amplifier coupled to the preamplifier and a comparator having a threshold voltage coupled to the differentiating amplifier and in which the time switch includes a counter block coupled to the comparator and in which the tension force change is defined as a certain signal from the preamplifier which is fed through the differentiating amplifier which is made to provide an output signal only by signal variations $$\frac{du}{dt} \neq 0$$

where du/dt is the rate of change of the certain signal from the preamplifier, and which when the output signal exceeds the threshold voltage of the comparator gives the counter block a RESET signal, in which case the preamplifier connected to the force measuring sensor, as well as the differentiating amplifier and comparator, are excepted from the shutting off by the time switch.

3. Tension dynamometer in accordance with claim 1, in which the time switch includes a counter block and performs a shut off after each count of n pulses, where n is a predetermined number.

4. Tension dynamometer in accordance with claim 3, in which the counter block has a RESET state which can be initiated by a switching pulse A and which starts a new count of n pulses.

5. Tension dynamometer in accordance with claim 1 in which the time switch includes a counter block and in which the voltage-to-frequency converter supplies a timing signal for the counter block.

6. Tension dynamometer in accordance with claim 1, in which the transfer circuit includes a final amplifier and in which a switching voltage $B_1$ produces a shut-off of the final amplifier and of the voltage-to-frequency converter by the time switch when a charging voltage is applied to the poles of the storage battery.

7. Tension dynamometer in accordance with claim 1, in which the time switch includes a counter block and in which, upon the application of a storage battery charge voltage B, a counter block RESET signal is likewise produced for the duration of the applied storage battery charge voltage, and in which, after the storage battery charge voltage is shut off, the counter block closes the time switch for the duration of n counting pulses where n is a predetermined number.

8. Tension dynamometer in accordance with claim 1, which includes an additional time switch for interrupting the power supply of all current-consuming elements after a time period $t_2$ of tension force constancy, $t_2$ being much long than $t_1$.

9. Tension dynamometer in accordance with claim 1, which includes a voltage-controlled switch for interrupting the power supply of all current-consuming elements when the storage battery voltage falls below an established level.

10. Tension dynamometer in accordance with claim 1, which includes first and second casings and in which electronic parts comprising the force measuring sensor, the voltage-to-frequency converter, and the transfer circuit are built into the first casing and the storage battery into the second casing.

11. Tension dynamometer in accordance with claim 10, which includes a connecting wire rope which contains two internal insulated conductors and having two ends comprising the first and second casings, and which includes a third connecting line formed between the two cable ends by the wire rope itself, the latter being at the ground potential of the electronic components, so that the wire rope and the casings act as an electrical shielding.

12. Tension dynamometer in accordance with claim 11, in which the wire rope is insulated from the storage battery casing so that the storage battery casing has a different potential than the other casing.

13. Tension dynamometer in accordance with claim 10, in which the two casings constitute poles through which a measurement alternating current is put out, these poles being simultaneously able to serve for the application of a charging voltage for the storage battery.

* * * * *